(12) United States Patent
Quirk et al.

(10) Patent No.: US 9,985,787 B2
(45) Date of Patent: May 29, 2018

(54) CONTINUOUS MONITORING OF FINGERPRINT SIGNATURE ON A MOBILE TOUCHSCREEN FOR IDENTITY MANAGEMENT

(71) Applicant: International Business Machines Corporation, Armonk, NY (US)

(72) Inventors: Aaron James Quirk, Cary, NC (US); Ching-Yun Chao, Austin, TX (US); Dennis DeLanoy Lingerfelt, Anderson, SC (US); William Daniel Whitt, Augusta, SC (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 14/829,359

(22) Filed: Aug. 18, 2015

(65) Prior Publication Data
US 2015/0356286 A1 Dec. 10, 2015

Related U.S. Application Data

(63) Continuation of application No. 14/104,690, filed on Dec. 12, 2013.

(51) Int. Cl.
*G06F 21/32* (2013.01)
*H04L 9/32* (2006.01)
(Continued)

(52) U.S. Cl.
CPC .......... *H04L 9/3231* (2013.01); *G06F 3/0488* (2013.01); *G06F 21/32* (2013.01);
(Continued)

(58) Field of Classification Search
None
See application file for complete search history.

(56) References Cited

U.S. PATENT DOCUMENTS

| | | | |
|---|---|---|---|
| 5,095,194 A * | 3/1992 | Barbanell | G06K 9/76 235/379 |
| 5,229,764 A * | 7/1993 | Matchett | G07C 9/00158 340/5.52 |

(Continued)

OTHER PUBLICATIONS

Feng (Feng et al. "Continuous mobile authentication using touchscreen gestures", 2012 IEEE Conference on Technologies for Homeland Security (HST), 11/12, 978-1-4673-2709-1/12, IEEE).*

(Continued)

*Primary Examiner* — Peter Poltorak
(74) *Attorney, Agent, or Firm* — David Zwick; David H. Judson; Jeffrey S. LaBaw

(57) ABSTRACT

A mobile device implements a state machine with full authentication, continuous authentication, and invalidation states. To access the device, the full authentication state requires the user to confirm his or her identity using some robust authentication technique. Upon success, the state machine transitions to the continuous authentication state wherein data samples are captured as the user interacts with the device and compared with stored exemplary fingerprints. Preferably, the state machine enforces a negative identification technique to determine whether the individual currently interacting with the touchscreen is not the user from which the exemplary fingerprints were generated. Upon such negative authentication, the state machine transitions to the invalidation state. In this state, operations (e.g., screen lock) are performed to secure the device against an unauthenticated use. On a next interaction, the state machine transitions to full authentication requiring robust authentication to continue operating in a normal mode.

4 Claims, 8 Drawing Sheets

(51) Int. Cl.
*G06F 3/0488* (2013.01)
*G06K 9/00* (2006.01)
(52) U.S. Cl.
CPC ..... *G06K 9/00013* (2013.01); *G06K 9/00067* (2013.01); *G06K 9/00087* (2013.01); *G06K 9/00355* (2013.01); *G06F 2203/04104* (2013.01); *G06K 9/00* (2013.01)

(56) References Cited

U.S. PATENT DOCUMENTS

| | | | | |
|---|---|---|---|---|
| 6,088,450 | A * | 7/2000 | Davis | G06F 21/35 235/380 |
| 6,148,094 | A * | 11/2000 | Kinsella | G06F 3/03549 345/167 |
| 7,088,220 | B2 | 8/2006 | Kotzin | G07C 9/00142 340/5.52 |
| 7,479,949 | B2 | 1/2009 | Jobs et al. | |
| 8,040,538 | B2 * | 10/2011 | Minamizawa | G06F 21/32 358/1.13 |
| 8,874,162 | B2 * | 10/2014 | Schrader | H04W 12/08 340/670 |
| 9,053,335 | B2 * | 6/2015 | Sambamurthy | G06F 21/554 |
| 2002/0196274 | A1 * | 12/2002 | Comfort | G06F 21/31 715/741 |
| 2004/0215968 | A1 * | 10/2004 | Rodwell | G06F 21/32 713/186 |
| 2005/0057339 | A1 * | 3/2005 | Ikehara | G06F 3/03543 340/5.52 |
| 2005/0071635 | A1 * | 3/2005 | Furuyama | G06F 21/32 713/168 |
| 2006/0288234 | A1 * | 12/2006 | Azar | G06F 21/32 713/186 |
| 2008/0040780 | A1 * | 2/2008 | Reinhold | H04L 63/0861 726/5 |
| 2008/0189549 | A1 * | 8/2008 | Hughes | G06F 21/10 713/171 |
| 2009/0183245 | A1 * | 7/2009 | Simpson | G06F 21/62 726/7 |
| 2010/0268961 | A1 * | 10/2010 | Cole | G06F 21/32 713/186 |
| 2011/0150291 | A1 * | 6/2011 | Jung | A61B 5/0404 382/115 |
| 2012/0046077 | A1 * | 2/2012 | Kim | H04M 1/72577 455/566 |
| 2012/0204257 | A1 * | 8/2012 | O'Connell | G06Q 30/06 726/19 |
| 2013/0104203 | A1 * | 4/2013 | Davis | H04L 9/3231 726/5 |
| 2013/0135247 | A1 * | 5/2013 | Na | G06F 21/32 345/174 |
| 2013/0154978 | A1 | 6/2013 | Kim et al. | |
| 2013/0274007 | A1 * | 10/2013 | Hilbert | A63F 13/00 463/29 |
| 2014/0250523 | A1 * | 9/2014 | Savvides | G06F 21/32 726/19 |
| 2014/0282965 | A1 * | 9/2014 | Sambamurthy | G06F 21/32 726/7 |
| 2014/0316984 | A1 * | 10/2014 | Schwartz | G06Q 20/4016 705/44 |

OTHER PUBLICATIONS

Angulo et al., "Exploring Touch-Screen Biometrics for User Identification on Smart Phones", Privacy and Identity 2011, IFIP AICT 375, pp. 130-143, 2012.*
Bo et al., "SilentSense: Silent User Identification via Dynamics of Touch and Movement Behavioral Biometrics", Department of Computer Science, Illinois Institute of Technology, USA, arXiv:1309.0073v1, Aug. 2013.*
Chan et al., "Touchpad Input for Continuous Biometric Authentication", CMS 2014, LNCS 8735, pp. 86-91, 2014.*
Yap et al., "Physical Access Protection using Continuous Authentication", 978-1-4244-1978-4/08, IEEE 2008.*
Xu et al., "Towards Continuous and Passive Authentication via Touch Biometrics: An Experimental Study on Smartphones", Symposium on Usable Privacy and Security (SOUPS) 2014.*
Jain (Jain et al., "Pores and Ridges: Fingerprint Matching Using Level 3 Features", The 18th International Conference on Pattern Recognition (ICPR'06), IEEE 0-7695-2521-0/06, '06).*
Drumea (Drumea et al., "Finite State Machines and their applications in software for industrial control", 27th Int'l Spring Seminar on Electronics Technology, 0-7803-8422-9/04, IEEE Sep. 2004).*
Sae-Bae (Sae-Bae et al., "Biometric-Rich Gestures: A Novel Approach to Authentication on Multi-touch Devices", ACM 978-1-4503-105-4/12/05, May 2012.*
Fujitsu, "Fujitsu Develops World's First Personal Authentication Technology to Integrate Palm Vein and Fingerprint Authentication" Jun. 2011.*
Yan, "Continuous Authentication Based On Computer Security," Lulea University of Technology Master's Thesis, 2009.
Powell et al, "Capacitive Touchscreen Enhancement," IPCOM000036550D, Jan. 29, 2005.
Anonymous, "Privacy Protection for Electronic Document Viewing," IPCOM000214962D, Feb. 16, 2012.
Al Solami, "Continuous biometric authentication: can it be more practical?" 12th IEEE International Conference on High Performance Computing and Communications, Melbourne, Australia Sep. 1-3, 2010.
Niinuma et al, "Continuous user authentication using temporal information", Proc. SPIE 7667, Biometric Technology for Human Identification VII, 76670L, Apr. 14, 2010.
Bours et al, "Continuous Authentication Using Biometric Keystroke Dynamics," The Norwegian Information Security Conference (NISK) 2009.

* cited by examiner

Reduce to hull grid ⌐902
Calculate Convex Hull ⌐904
Calculate the number of nominal sensors within the convex polygon defined by the hull points ⌐906
If nominal sensors within the convex polygon>threshold ⌐908
    Disambiguate individual fingertips ⌐910
Else
    Return all regions selected ⌐912

Reducing the full grid to the hull grid:

For i = 0 to Sensor_Width step 1

For j = 0 to Sensor_Height step 1

Hollow_grid[ i ][ j ] ← grid[ i ][ j ]

If grid [ i ][ j ] > $\iota$ then

If (grid [ i+1 ][ j ] > $\iota$)AND (grid [ i-1 ][ j ] > $\iota$)AND(grid[ i ][ j+1 ] > $\iota$)AND(grid[ i ][ j+1 ] > $\iota$) then Hollow_grid[ i ][ j ] ← -0

END If

END If

END For

END For

FIG. 10

Disambiguate individual fingertips:

Determine Centroid of the region bounded by the convex polygon ~1102

Take minimum path to the boundary of the polygon ~1104

Generate a linear equation to each path and separate the two regions ~1106

Return distinct regions ~1108

FIG. 11

CONTINUOUS MONITORING OF FINGERPRINT SIGNATURE ON A MOBILE TOUCHSCREEN FOR IDENTITY MANAGEMENT

BACKGROUND OF THE INVENTION

Technical Field

This disclosure relates generally to securing data on mobile devices that include touchscreens.

Background of the Related Art

Biometrics refers to the field of technology where an individual is identified using biological traits. Biometrics has been utilized to verify or otherwise authenticate the identity of a user for security purposes, such as for controlling access to devices or information. Many types of biometrics may be utilized, such as facial recognition, voice recognition, retinal and iris recognition, and fingerprints.

Mobile devices, including tablets and smart phones, are commonplace and increasingly being used over networks and the wider Internet. These devices are being used frequently to transfer secure data such as personal details, credit card transactions, voice-over-IP calls, and the like. As a consequence, there is an increasing need to make such mobile devices more secure. Conventionally, mobile devices enforce security by providing a screen lock function that locks the display screen after a configurable idle time-out. To re-use the device, the user must re-enter his or her password, typically a four digit numerical code. More sophisticated approaches include fingerprint sensors, which typically are hardware-based and are programmed to recognize the user's fingerprint before un-locking the device for use.

In an era when bring-your-own device policies are expanding and corporate security is less tethered to physical security, effective measures to identify users and manage access to protected resources are essential. Unfortunately, many current standard practices reduce user productivity and increase user frustration. As noted above, the most common technique for enforcing mobile device security is the idle time-out, forcing the user to re-authenticate after a short period of idle time. This requirement causes the user to frequently waste time re-authenticating to his or her device, and it can lead to usability problems, e.g., in the case of showing a video or presentation that is longer than the time-out period. Other approaches, such as keystroke analysis, are highly-effective in cases where a physical keyboard exists, and where interactions use the keyboard. In many touch-screen environments, however, there is no physical keyboard, and the interactions with a virtual keyboard are less frequent than other interaction types. Thus, keystroke analysis is not practical.

One way to address the problem of requiring a user to re-authenticate to his or her device repeatedly (after screen locks) is to perform so-called "continuous authentication." Continuous authentication refers to the notion of continuously detecting, monitoring and analyzing some biometric through the course of a user's interaction with a system. One such known technique suggests the use of a fingerprint biometric, but it requires the user to specifically re-scan his or her finger on a device that is separate from the system in use. This is impractical for a device-specific approach.

While fingerprint scanning for device-based access control is known, the techniques typically are based on guided software biometric identification and, thus, are not useful for continuous authentication. This is because such techniques require for their efficacy high quality samples, as well as sample and interaction equality, which are conditions that cannot be guaranteed in a typical usage situation wherein the user performs frequent multi-touch operations or otherwise interacts with the touchscreen in a manner that does not enable capture of useful sample data.

There remains a need to provide techniques to continuously monitor fingerprint signatures on a mobile capacitive touchscreen to facilitate continuous user authentication.

BRIEF SUMMARY

According to this disclosure, a mobile device includes a mechanism by which a user, following an initial full authentication, continuously authenticates to the device via his or her unique fingerprint signature as recognized on the device's touchscreen, thereby ensuring robust security measures necessary for both personal and corporate security while freeing the user from manually performing the task of authentication repeatedly.

Preferably, the mechanism is implemented in software executing on the device as a state machine, with at least three (3) states: full authentication, continuous authentication, and invalidation. When the user first initiates operation of the device (or some application executing thereon), the state "full authentication" requires the user to confirm their identity using some robust authentication technique (e.g., passphrase entry, hardware authentication, or guided-software biometric identification). Upon a successful full authentication, the state machine transitions to the continuous authentication state. In this state, exemplary fingerprints for the user are loaded from a data store and are continuously compared against data samples captured as the user interacts with the device in general use. Because the quality of the samples may not be high, the state machine preferably enforces a negative identification technique instead of a positive one (wherein a fingerprint match must be seen and the user's identity positively verified). In effect, the recognition technique compares the data samples against the exemplary fingerprints to determine whether the individual currently interacting with the touchscreen is not the user from which the exemplary fingerprints were generated. Due to the low resolution and quality of samples during routine interaction, the state machine remains in the continuous authentication state until such time as a negative match is statistically very likely. At the time of such negative authentication, the state machine transitions to the invalidation state. In this state, operations are performed to secure the device (or the application) against an unauthenticated user. These operations include, for example, locking the screen, placing the device into a degraded mode, providing a reduced or limited subset of available functions, or the like. On a next interaction, the machine transitions back to the "full authentication" state, thereby requiring robust authentication to continue operating in a normal mode.

The foregoing has outlined some of the more pertinent features of the disclosed subject matter. These features should be construed to be merely illustrative. Many other beneficial results can be attained by applying the disclosed invention in a different manner or by modifying the disclosed subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 10 illustrates sample pseudo-code for a technique to reduce a full grid to a hull grid according to this disclosure; and FIG. 11 illustrates sample pseudo-code for a finger disambiguation technique to disambiguate individual fingertips in a sample.

DETAILED DESCRIPTION OF AN ILLUSTRATIVE EMBODIMENT

Figure 1:
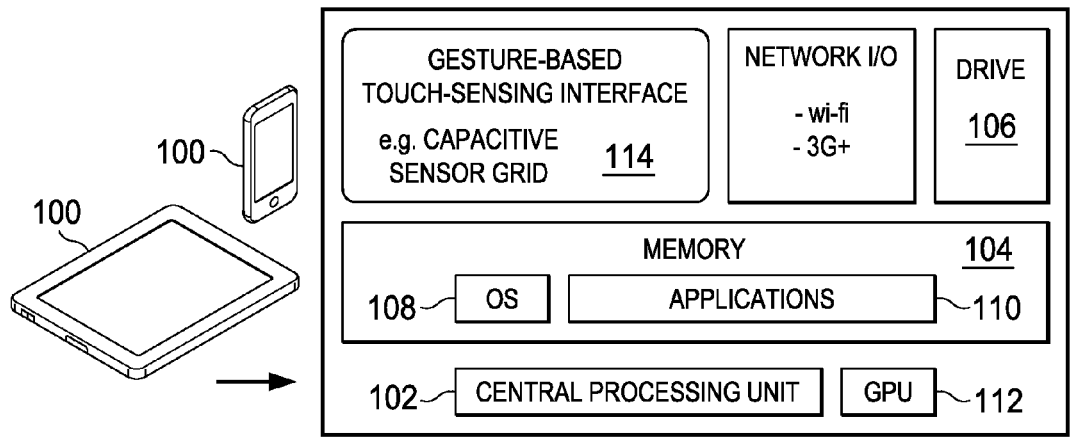
FIG. 1 depicts an exemplary block diagram of a representative mobile device in which the techniques of this disclosure may be implemented.
Figure 2:
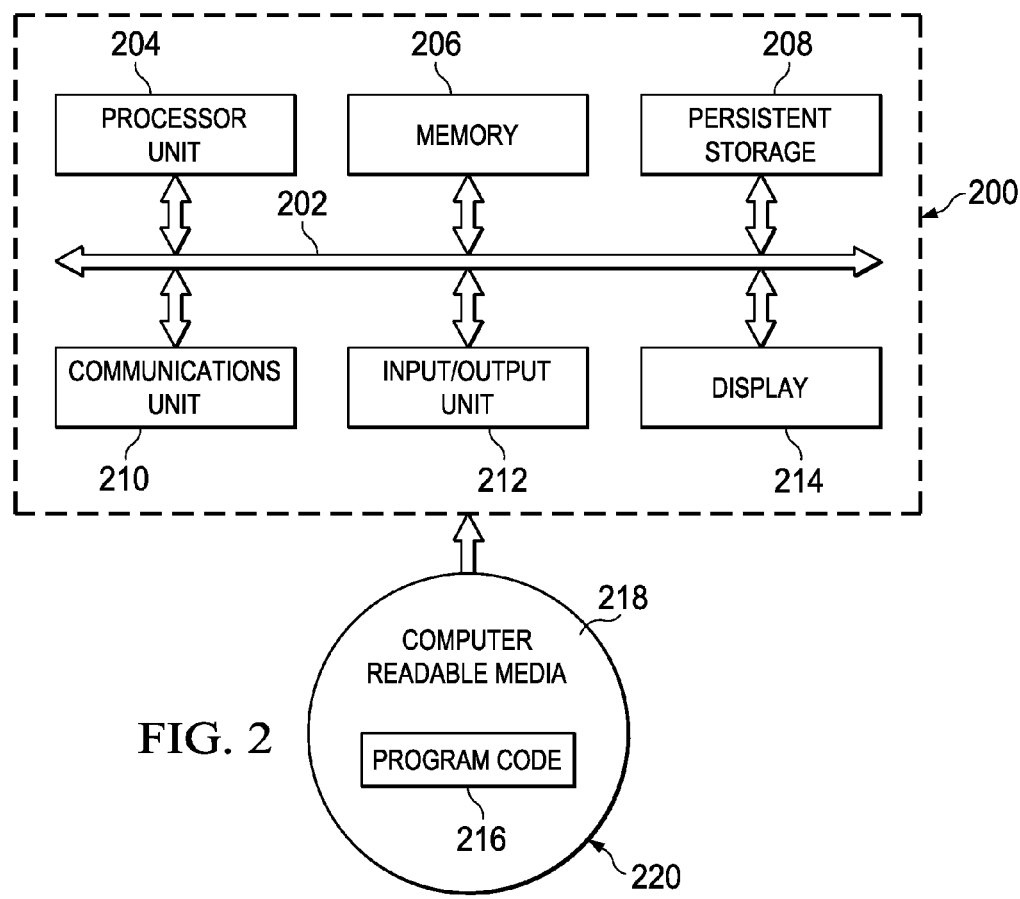
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

FIG. 1 illustrates representative mobile devices, namely, a smartphone 100, and a tablet device 102. As is well-known, such devices typically comprise fast processors, large amounts of memory, gesture-based multi-touch screens, and integrated multi-media and GPS hardware chips. Many of these devices use open mobile operating systems, such as Android. The ubiquity, performance and low cost of mobile devices have opened the door for creation of a large variety of mobile applications including, without limitation, applications that require or take advantage of cryptographic operations. Such operations may be associated with a particular application, or the device operating system itself. As will be described, the techniques herein may be implemented with respect to any computing entity application that requires a cryptographic operation that is facilitated with mobile device-resident cryptographic materials (e.g., keys, nonces, one-time pads, and salts). Further, the disclosed entropy pooling technique may be used with any form of cryptographic scheme (including, without limitation, encryption/decryption, digital signature generation and verification, message validation, and the like) or cryptographic protocol.

With reference now to FIG. 2, a block diagram of an exemplary data processing system is shown in which aspects of the illustrative embodiments may be implemented. Data processing system 200 is an example of a computer, such as mobile device 100 or 102 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as a mobile device of FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, Objective C, C++ or the like, and conventional procedural programming languages, such as the "C" programming language or similar programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

Without limitation, the techniques described herein may operate in conjunction within mobile devices operating according to a standard client-server paradigm in which client machines communicate with an Internet-accessible server(s) executing on a set of one or more machines. In such a scenario, end users operate Internet-connectable devices (e.g., Internet-enabled mobile devices, or the like) that are capable of accessing and interacting with the server(s). Typically, each client or server machine is a data processing system such as illustrated in FIG. 2 comprising hardware and software, and these entities communicate with one another over a network, such as the Internet, an intranet, an extranet, a private network, or any other communications medium or link. Generalizing, a data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Mobile Device Technologies

As described above, mobile device technologies also are well-known. In a representative but non-limiting embodiment, a mobile device is a smartphone or tablet, such as the iPhone® or iPad®, an Android™-based mobile device, or the like. Referring back to FIG. 1, a device of this type typically comprises a CPU 102, computer memory 104, such as RAM, and a data store 106. The device software includes operating system (e.g., Apple iOS, Android, Blackberry OS, Windows Mobile, or the like) 108, and generic support applications and utilities 110. Typically, the device includes a separate graphics processing unit (GPU) 112. A touch-sensing device or interface 114, such as a capacitive touchscreen, is configured to receive input from a user's touch and to send this information to processor 112. The interface 114 responds to gestures on the touch sensitive surface. Other input/output devices include software-based keyboards, cameras, microphones, accelerometers, magnetometers, radio or WiFi mechanisms, and the like.

More generally, the mobile device is any wireless client device, e.g., a cellphone, pager, a personal digital assistant (PDA, e.g., with GPRS NIC, WiFi card, etc.), a mobile computer with a smartphone client, or the like. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

For example, a mobile device as used herein is a 3G- (or next generation) compliant device that may include a subscriber identity module (SIM), which is a smart card that carries subscriber-specific information, mobile equipment (e.g., radio and associated signal processing devices), a man-machine interface (MMI), and one or more interfaces to external devices. The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Generalizing, the mobile device is any wireless client device, e.g., a smartphone, a tablet, a personal digital assistant (PDA, e.g., with GPRS or WiFi-based NIC), a mobile computer with a smartphone or tablet-like client, or the like. Other mobile devices in which the technique may be practiced include any access protocol-enabled device (e.g., a Blackberry® device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Using a Touchscreen as a Biometric Device

Figure 3A:
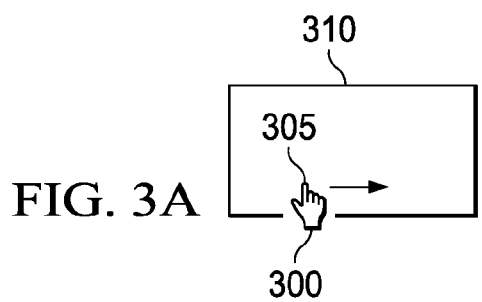
FIGS. 3A and 3B are diagrams of a user swiping a fingerprint across a touch sensitive display in which various embodiments may be implemented.
Figure 3B:
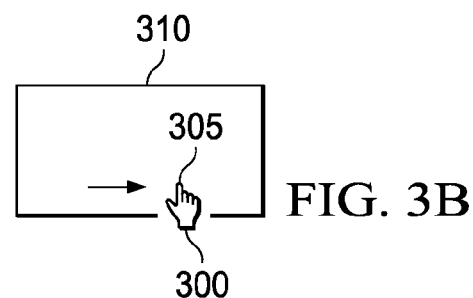

FIGS. 3A and 3B are diagrams of a user swiping a fingerprint across a touch sensitive display. A user uses his or her hand 300 to swipe an index fingertip 305 horizontally across a touch sensitive display 310 from left to right. Display 310 then utilizes an array of sensors (i.e. a sensor grid) embedded in the display to detect the fingerprint of the user based on this act of swiping as explained further below. The touch sensitive display may be a self-capacitive or other type of touch sensitive display with an array of sensors for detecting the location of a touch across multiple sensors. The touch sensitive display may generate a set of values relating to the amount of skin in direct contact with the display such as a set of values of detected capacitance by the sensor grid. Display 310 is shown in a landscape mode, but may be positioned in a portrait mode. The fingertip swipe is shown to be horizontal from left to right, but may be vertical, at an angle, or from right to left depending on the configuration of the system. The right hand fingertip is used in this example, but alternative fingertips may be used of either hand as well as other portions of the fingers or hands.

Figure 3C:
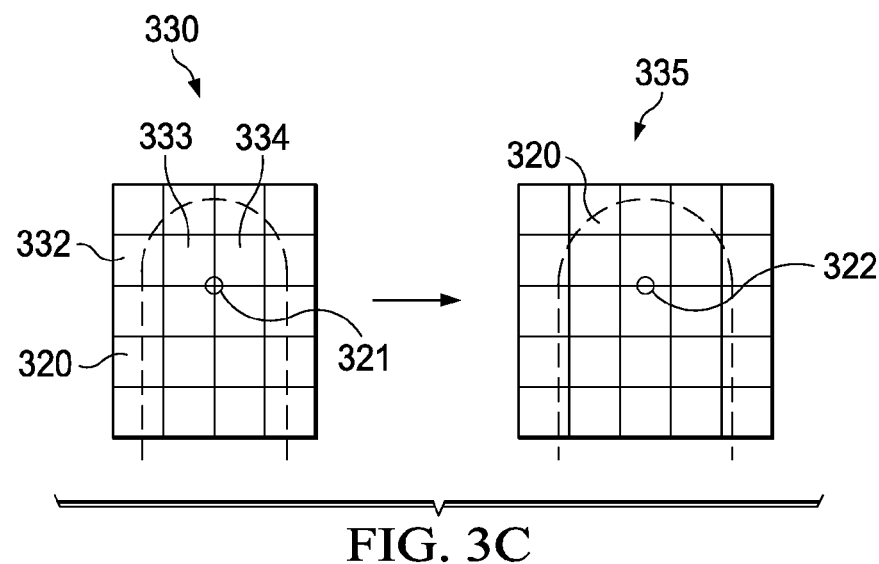
FIG. 3C is a diagram of a fingerprint being detected by an array of sensors embedded in a touch sensitive display in which various embodiments may be implemented.

FIG. 3C is a diagram of a fingerprint being detected by an array of sensors embedded in a touch sensitive display. In the first part of FIG. 3C, fingerprint 320 touches a five by four (rows and columns) set of sensors 330 at time T1. The center of fingerprint 320 is centroid 321. Each of the sensors detecting fingerprint 320 includes a value relating to the amount of capacitance detected. For example, sensor 332 may detect about half of a capacitance of sensor 333. However, sensor 333 may detect more or less capacitance than sensor 334 because of the number of ridges or valleys or the width thereof that are in contact or not with each sensor. Also in FIG. 3C, fingerprint 320 touches a five-by-five set of sensors 335 at time T2. The center of fingerprint 320 at time T2 is centroid 322. Each of the sensors detecting fingerprint 320 includes a value relating to the amount of capacitance detected.

Figure 3D:
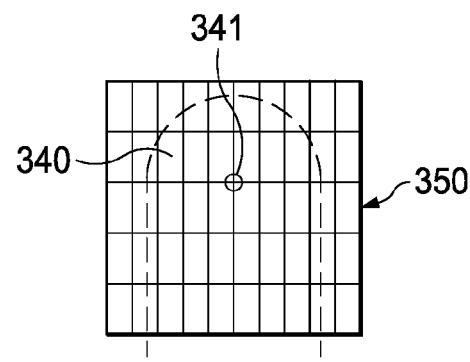
FIG. 3D is a diagram of a combination of the sensor readings of FIG. 3C at times T1 and T2 in which various embodiments may be implemented.

FIG. 3D is a diagram of a combination of the sensor readings of FIG. 3C at times T1 and T2 in which various embodiments may be implemented. The overlap of the two illustrations is based on centroid 341 of fingerprint 340, which was derived from centroids 321 and 322 of fingerprint 320. The values of sensors 330 and 335 may be combined into the various values of 350 by addition, subtraction, or other more complex statistical operations as more samples are combined. With a sufficient number of appropriate samples, the fingerprint of the user can be resolved as described below. The number of sensors utilized may be more or less than shown in FIGS. 3C and 3D. As the user swipes a fingertip across a touch sensitive display, hundreds of samples may be taken during the swipe process and compared or otherwise statistically processed as described below for the purpose of determining the user's fingerprint with the touch display.

Where one or more horizontal swipes are effective for resolving the vertical ridges of a fingerprint, it is much less effective for resolving the horizontal ridges of a fingerprint. As a result, one or more vertical swipes may also be utilized for fully resolving the fingerprints of a fingertip. Alternatively, angular swipes not horizontal or vertical may also be utilized so long as there is sufficient scan in both dimensions to fully document the geometry of the fingerprint.

Figure 4:
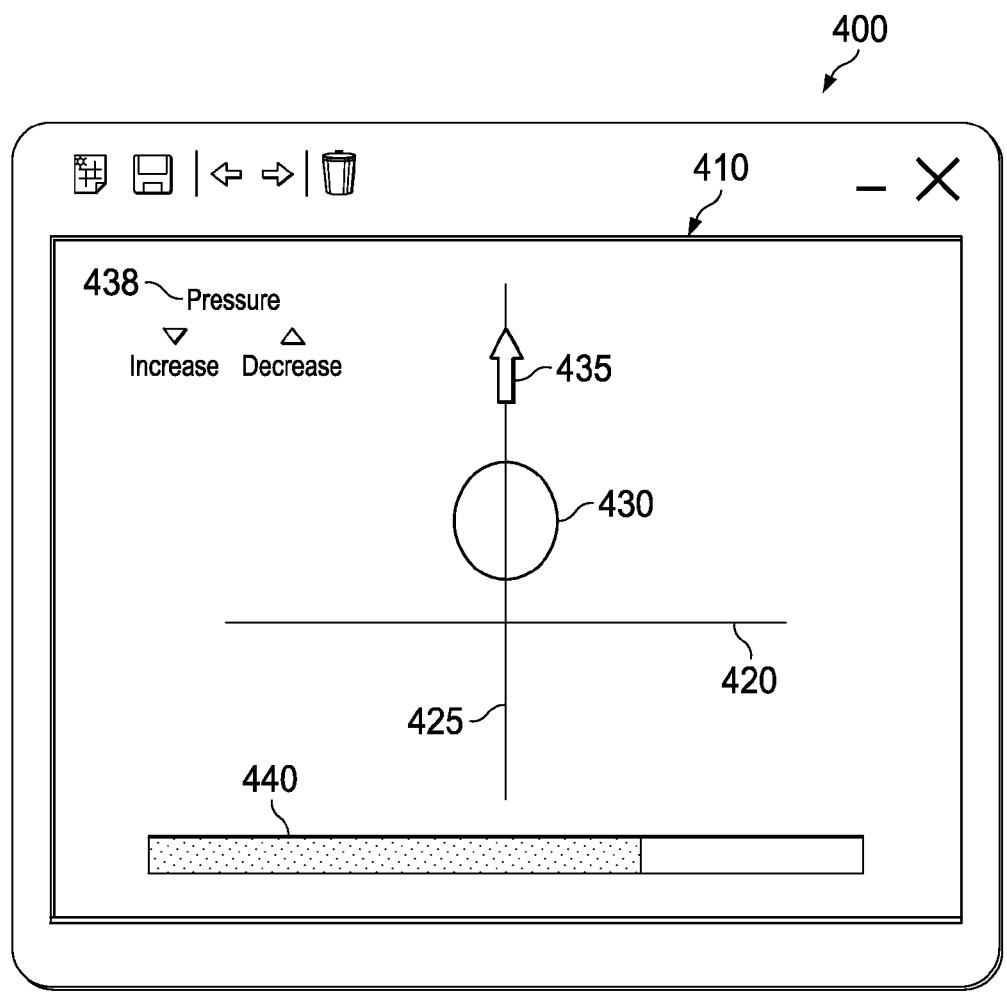
FIG. 4 is a diagram of a user interface for instructing a user to swipe their fingerprint in which various embodiments may be implemented.

FIG. 4 is a diagram of a user interface 400 for instructing a user to swipe their fingertip. A touch sensitive display 410 shows a horizontal swipe line 420 and a vertical swipe line 425. The user is expected to place his or her fingertip on a moving region 430 and proceed in direction of arrow 435 at a constant velocity. The velocity or speed of the swipe should match the speed of region 430 along either the horizontal or vertical lines. The pressure of the swipe should be increased or decreased in accordance with the pressure indicators 438. The user may be instructed to swipe his or her fingerprint several times in either the horizontal or vertical direction. This allows sufficient samples to statistically determine the fingerprint of the user's fingertip. A percentage of completion of the swiping process may be shown in bar 440, thereby providing feedback to the user of the continued success of the swiping process. The percentage of completion may be based on a measure of dispersion such as a confidence interval for the results of the fingerprint samples.

Three different coordinate systems can be utilized. A first coordinate system is a device resolution absolute coordinate system. That is, the array of sensors utilized in the touch screen for sensing the touch of a user. If the touch screen has an array with 450 rows of sensors and 800 columns on sensors, then there would be a total of 34000 sensors in an X-Y coordinate system with the bottom left sensor set as (0, 0) and the upper right sensor set as (450, 800). Alternative embodiments may utilize the upper right sensor as the (0, 0) sensor as well as other configurations. A second coordinate system is a device resolution local coordinate system. This coordinate system has the same resolution as the device absolute local coordinate system, but with the centroid of the detected fingerprint set as (0, 0). For example, if the centroid is located at (200, 300) of the device absolute coordinate system, then point (400, 425) of a device absolute coordinate system would be point (200, 125) of the device resolution local coordinate system. For ease of reference, the first coordinate system can be referred to with points (X1, Y1), and the second coordinate system can be referred to with points (X2, Y2). A third coordinate system is an interpolated high resolution coordinate system. This is a much higher resolution coordinate system and is used for identifying the ridges and valleys of the user's fingerprints. As a result, this coordinate system needs to be at a resolution sufficient to perform that identification. The centroid of a fingerprint is set to (0, 0) in the third coordinate system. For ease of reference, a point in the third coordinate system can be referred to as (X3, Y3). The resolution difference between the third and the other coordinate systems is represented as a. For example, if α=square root of 2, then the third coordinate system will have twice the resolution of the first and second coordinate systems (i.e. square root of 2 increase in resolution in the x direction and square root of 2 increase in the y direction). If α=2, the overall resolution would increase by a factor of 4 because the value α is applied in each direction. Both the second and third coordinate systems would have a common (0, 0) center point with the second coordinate system. The sample data may be converted directly from the first coordinate system to the third coordinate system in a single step, thereby speeding up the conversion process.

Some of the mathematics which can be utilized with these coordinate systems is as follows. Let $C_a$ represent the rectangular region bounding the area of non-nominal (e.g. non-zero) capacitance stored in a T×U matrix at time a. For example, FIG. 3C illustrates a 5×4 matrix at time T1 and a 5×5 matrix at time T2. Let $cent_a$ represent the centroid location of $C_a$ in the device absolute coordinate system. Let $C_{a-1}$ represent the rectangular region bounding the area of non-nominal (e.g. non-zero) capacitance stored at time a−1 with centroid $cent_{a-1}$, also in the device absolute coordinate system. Let $D_a$ represent the vector difference between $cent_a$ and $cent_{a-1}$.

A function, T, converts from $C_a$ to $C_{fa}$:

$$T(C_n)_{x,y} = \begin{cases} a(x), a'(y) \geq 0 \wedge a(x) < t \wedge a'(y) < u : C_{n_{a(x),a'(y)}} \\ a(x), a'(y) < 0 \vee a(x) \geq t \vee a'(y) \geq u : 0 \end{cases}$$

where $$a(x) = \left\lfloor \frac{x - (D_x - L_x)}{\alpha} \right\rfloor$$

and $$a'(y) = \left\lfloor \frac{y - (D_y - L_y)}{\alpha} \right\rfloor$$

This provides for a direct conversion from a device resolution absolute coordinate system to a high resolution coordinate system prior to interpolation.

To generate a mean one sample at a time from converted and interpolated samples, let $C_{fa}$ be a high resolution matrix of size α*T×α*U with $C_{f0}$ having an initial value:

$$\overline{C}_{f_n} = \frac{\frac{(n-1)\sum_{i=1}^{n-1} C_{f_i}}{(n-1)} + C_{f_n}}{n}$$

which reduces further to:

$$\overline{C}_{f_n} = \left[ \sum_{i=1}^{n-1} C_{f_i} + C_{f_n} \right] \div n$$

and finally to:

$$\overline{C}_{f_n} = \frac{(n-1)\overline{C}_{f_{n-1}} + C_{f_n}}{n}$$

As each step of calculating the mean C bar, the underlying geometry gains additional resolution, and at each step, the weight of the new sample has a lower impact than the accumulated data, creating a realistic model of capacitance on a higher density sensor grid using a lower density grid that has a much lower cost.

Figure 5:
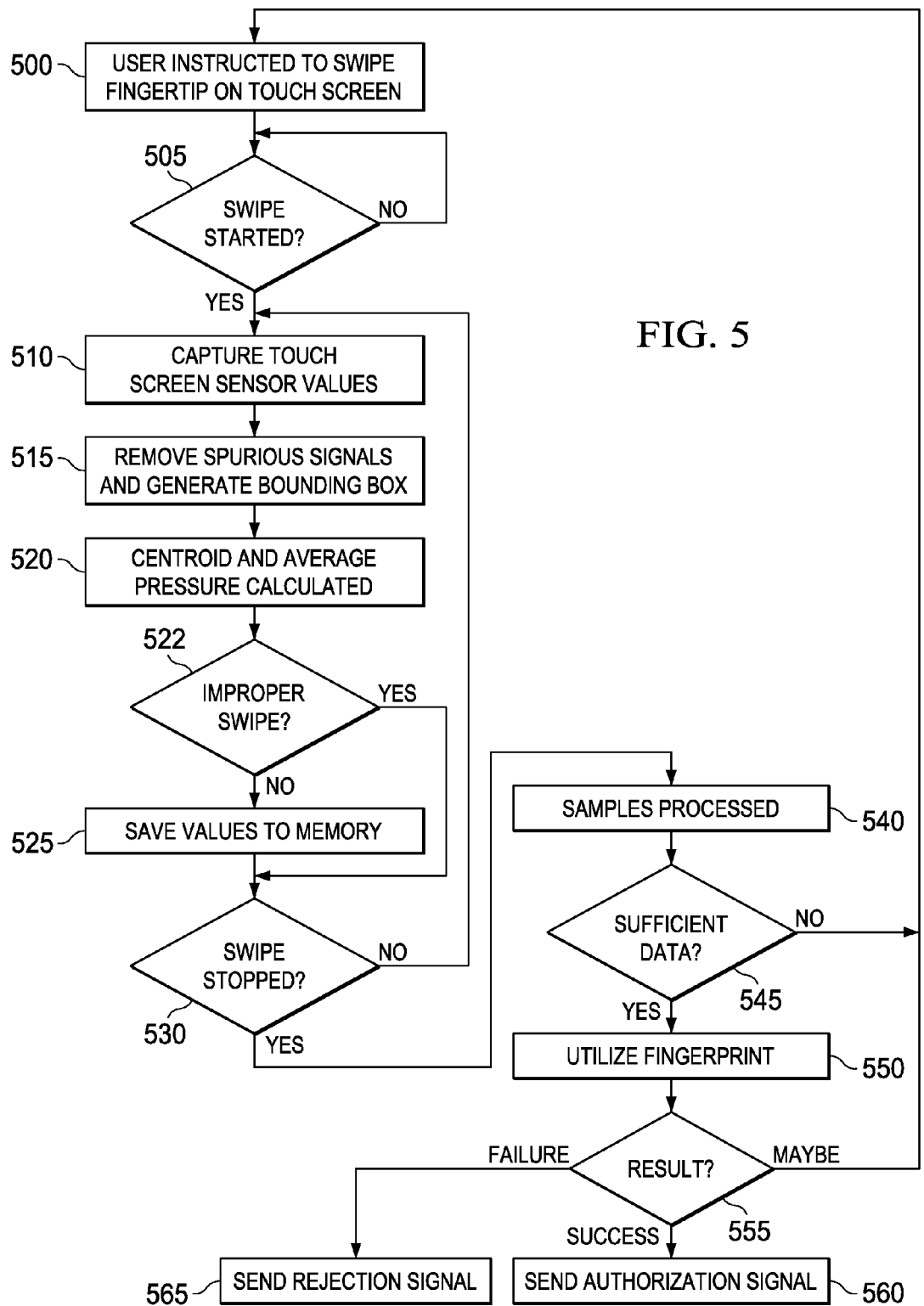
FIG. 5 is a flow diagram of the process for determining the fingerprints of a user in accordance with a first embodiment.

FIG. 5 is a flow diagram of the process for determining the fingerprints of a user in accordance with a first embodiment. In a first step 500, the user is instructed to swipe his or her fingertip across the touch screen. This instruction may be provided using the user interface illustrated in FIG. 4 above. In a second step 505, the system determines whether the user has initiated the swipe. If yes, then processing continues to step 510, otherwise processing returns to step 505. This can be detected by polling the touch screen sensors or utilizing an operating system callback to determine whether the user has touched the screen and has started moving the point of touch in the direction desired.

In step 510, a sample of the values of the non-nominal sensors is captured with a time stamp. This sample can be performed about 100 times a second, although fewer or more samples may be obtained so long as it is within the performance characteristics of the display. In step 515, any sample values not contiguous to the majority of sample values are then removed or otherwise deleted as spurious signals in an initial filter or filtration step. The remaining sample values may be isolated and captured as a bounding box or matrix containing all the contiguous non-nominal values. The size of a sample bounding box may vary from sample to sample within a certain expected range. For example, the set of pixels represented by the bounding box should not be much larger than the size of a fingerprint. However, some non-nominal pixels in a perimeter may be excluded so long as it is balanced (not more on one side or the other) to keep from affecting the centroid to be calculated below. A check may also be performed to verify that the sample is close in location on the display to the previous sample, indicating a correct sample. The shape of the bounding box may also indicate if the user is tilting the finger improperly during the swipe.

Then in step 520, the centroid of the remaining captured sample values is calculated using a weighted average. That is, if the values to the right of the median center point have a heavier weight than the values to the left of the median center point, then the user's fingertip is more to right of the median center point and the centroid should reflect that. Concurrently, an average fingerprint pressure also is calculated. This average pressure can be determined by various techniques including the size of the fingerprint sample relative to other fingerprint samples. Alternatively, for a capacitive touch screen, the total capacitance over the captured sample area (i.e. the bounding box) may be compared to an expected range to determine whether too much or too little pressure was applied.

Subsequently in step 522, it is determined whether the latest finger swipe sample was too heavy, too light, tilted, too slow, too fast or otherwise improper creating an unacceptable sample. For example, the bounding box size may indicate the pressure was too heavy or too soft, the bounding box shape may indicate that the finger was improperly tilted during the swipe, the distance between samples may indicate that the velocity of the finger swipe was too fast or too slow, etc. The pressure, tilt or velocity can be determined by various techniques including the size, the shape, or the location of a fingerprint sample relative to other fingerprint samples. Alternatively, for a capacitive touch screen, the total capacitance over the captured sample area (i.e. the bounding box) may be compared to an expected range to determine whether too much or too little pressure was applied. If yes, then processing proceeds to step 530 to continue taking swipe samples (with an indicator of more or less pressure or other instructions such as described above with reference to FIG. 4), otherwise processing continues to step 525.

Then in step 525, the remaining non-nominal values, the time stamp, and the tentative centroid are saved to memory for processing as described below. Each time stamped sample is a matrix $C_a$ (at time a) with centroid $cent_a$ from 1 to n where n is the number of samples taken during the swipe. By storing the unprocessed data, generally more samples can be taken more quickly without running into processing limitations. However, alternative embodiments may process each sample of data as described below before taking the next sample of the current finger swipe. Subsequently in step 530, it is determined whether the user has stopped the finger swipe. If yes, then processing proceeds to step 540, otherwise processing returns to step 510 for another sample of the touch screen sensors. This can be detected by determining whether any of the touch screen sensors is detecting a touch or whether the past two or more samples have essentially the same value, indicating the user has stopped moving his or her fingertip across the screen. The number of samples should correspond to the speed of the user's finger across the screen and the resolution of the third coordinate system in the direction of the finger swipe (e.g. square root of $\alpha$)

In step 540, the time-stamped samples are then processed in accordance with the formulas described above and as further described in FIG. 6 below to generate a resolved fingerprint. In step 545, it is determined whether sufficient data has been captured to resolve the fingerprint of the user. For example, there may be a minimum number of swipes before determining that there may be sufficient data to do a comparison of the resolved fingerprint to a set of fingerprints (one or more) to determine whether the resolved fingerprint is an authorized fingerprint. Alternatively, a measure of dispersion such as a confidence interval with a desired range or a desired standard deviation may be utilized to determine whether sufficient number of samples has been collected. If there is not sufficient data, then processing returns to step 500, otherwise, processing continues to step 550.

In step 550, the resolved digital fingerprint is then utilized as desired such as for security purposes. For example and as described with reference to this figure, the resolved digital fingerprint may be compared to a stored set of fingerprints (stored locally or remotely across a network) to determine whether the fingerprints are the same or different. This can result in one of several actions in step 555. If the resolved fingerprint is similar enough to one of the stored fingerprints (success), then an authorization signal may be provided in step 560. This signal may be a software instruction or an electronic signal which may be utilized by an operating system or application to notify the user and authorize the desired activity by the user. If the resolved fingerprint is sufficiently dissimilar from any of a stored set of fingerprints (failure), then a rejection signal may be provided in step 565. This signal may be a software instruction or an electronic signal which may be utilized by an operating system or application to notify the user and prevent the desired activity by the user. A failure signal may also be sent after a certain number of swipes if success has not been achieved yet. Alternatively, if the resolved fingerprint is similar to one or more of the stored set of fingerprints but not sufficiently similar for success (maybe), then further swipes would be requested to make a solid determination of success or failure with processing returning to step 500.

Figure 6:
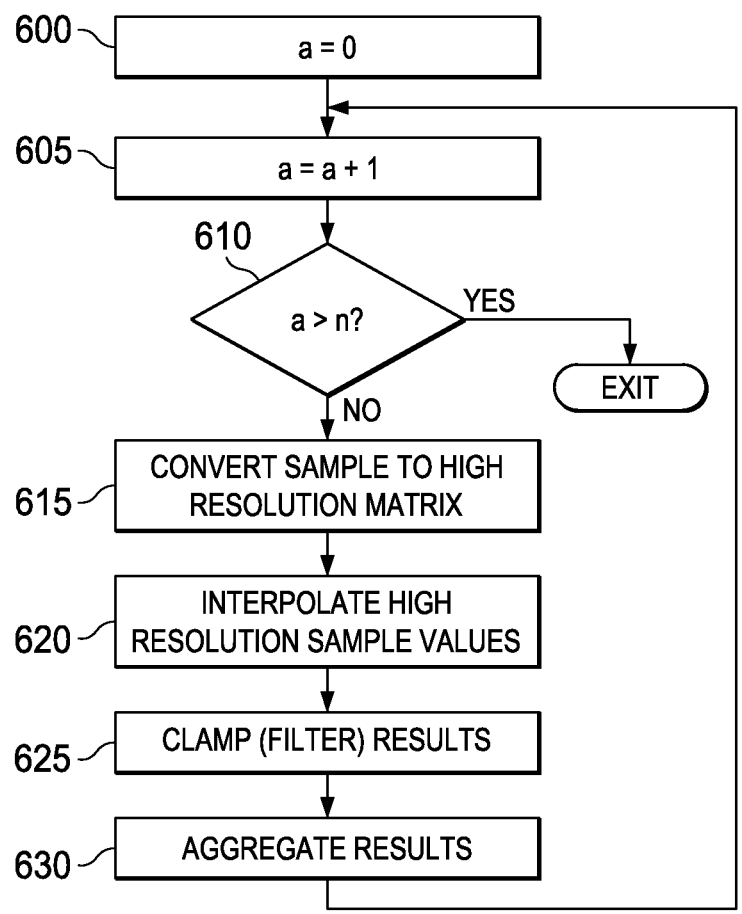
FIG. 6 is a flow diagram of a process for converting, interpolating and aggregating fingerprint sample data in which various embodiments may be implemented.

FIG. 6 is a flow diagram of a process for converting, interpolating and aggregating fingerprint sample data. Each time stamped sample is a matrix $C_a$ at time a with centroid $cent_a$ from 1 to n where n is the number of samples taken during the swipe. In a first step 600, a is set to 0. In step 605, a is then incremented by 1. In step 610, it is determined whether a is greater than n. If yes, then the sampled swipe has been converted, interpolated and aggregated, so processing ceases (i.e. returns to FIG. 5 or 7 for possibly another fingertip swipe to be processed). If not, then processing continues to step 615.

In step 615, sample $C_a$ is then converted from a device resolution absolute coordinate system to a high resolution local coordinate system as sample $C_{fa}$ utilizing the formulas described above. This can include calculating a vector difference between $cent_a$ and $cent_{a-1}$. The sample values are unchanged and each value may be allocated to multiple entries of the high resolution matrix. For example, where a is equal to 2, then four entries may have the same value as the underlying device resolution entry. In this embodiment, interpolations are performed after the conversion, although they could be performed during the conversion process. Another step of filtering could be performed at this step where the focus is on the more inner pixels of each sample rather. This is because the outer or perimeter samples may be less precise due to less finger pressure causing fewer samples of the outer pixels.

In step 620, sample $C_{fa}$ is then interpolated to $C_{ia}$ where the sample values in the high resolution matrix are adjusted based on surrounding values, thereby providing a more accurate estimation of the underlying sampled fingerprint. Various types of interpolation may be utilized in order to better estimate the fingerprint being sampled such as a linear interpolation, quadratic interpolation, etc. This interpolation may also include other factors such as average pressure or sample size to better interpolate and normalize the results compared to other samples. It is generally preferable that the method of interpolation utilized here matches the type of interpolation utilized to generate any fingerprint to be compared to this sampled fingerprint. Otherwise, the chance of a successful match with the same fingerprint may be significantly reduced. As mentioned above, the step of interpolation may be performed during the conversion process.

Next, in step 625, the resulting interpolated sample matrix $C_{ia}$ may be clamped generating matrix $C_{ca}$. That is, the outer pixels or sample values may be ignored or just removed. This allows this process to focus on the central elements of the fingerprint and to disregard the outer elements or pixels where there may be a greater margin of error due to slight fingertip tilting, some lack of fingerprint pressure in some samples, or just interpolation variation caused by the lack of adjoining samples on all sides. This step of clamping is performed on the interpolated data rather than the raw data as the raw data may be useful in the interpolation process.

Finally, in step 630 clamped sample $C_{ca}$ is then aggregated with prior samples. This may be performed utilizing the formulas described above where a running average is generated for each matrix element. Alternative aggregation techniques can be utilized including regression analysis. Also, multiple aggregations may be generated. For example, there may be one aggregation for swipes running left to right (or up to down) and a separate aggregation for swipes running right to left (or down to up). This is because the fingertip deforms slightly depending on the direction of the swipe. As a result, a combination of left to right and right to left samples may provide somewhat of a stereoscopic view of the fingerprint. The separate aggregations may be combined once the swipe is completed or all swipes are completed, or they may be retained separately if the stored fingerprint used for comparison is also retained in multiple aggregates.

Once the aggregation is completed, processing then returns to step 605 for processing the next sample. This continues until all samples of the current set of samples for a fingertip swipe have been processed.

Figure 7:
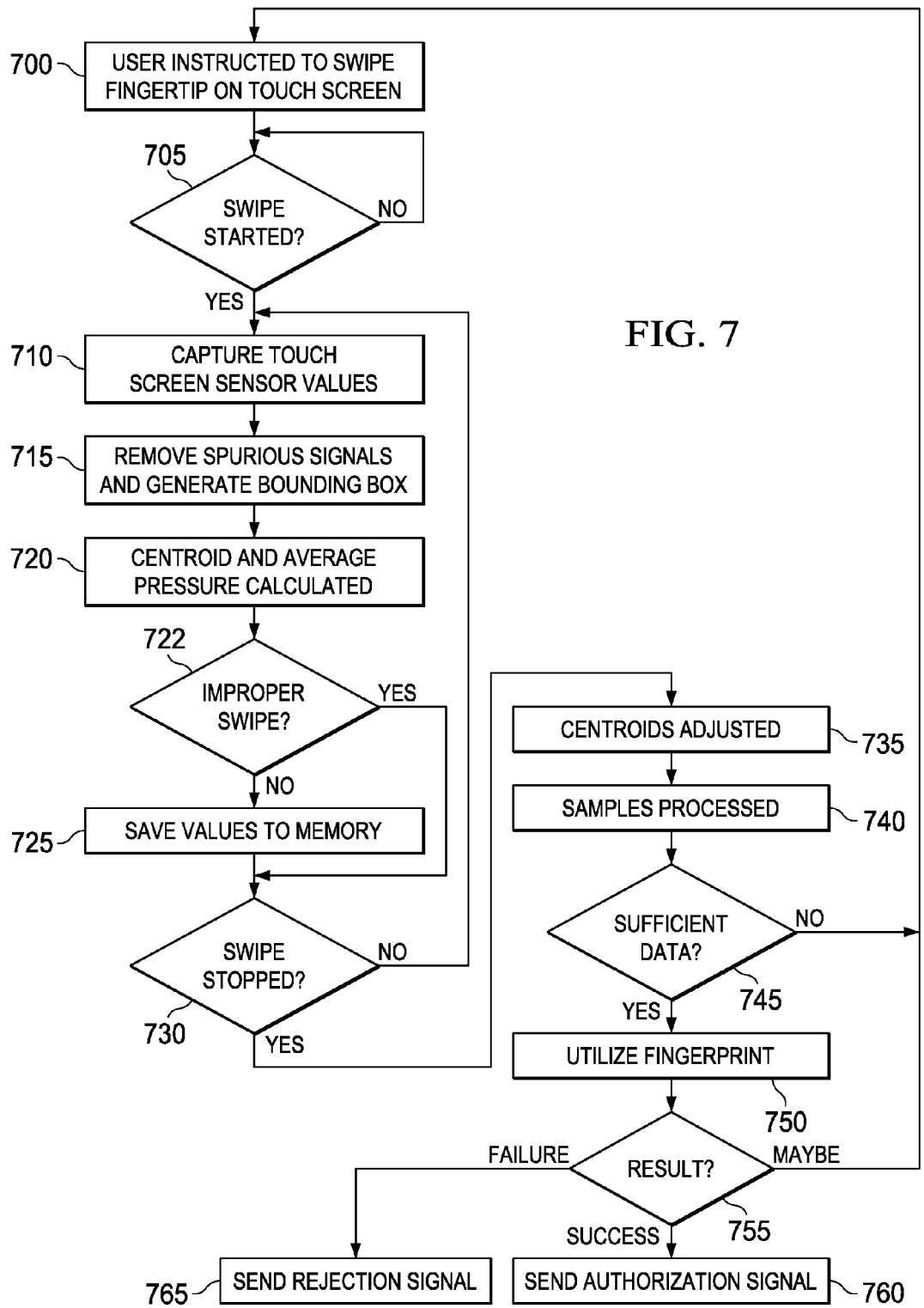
FIG. 7 is a flow diagram the process for determining the fingerprints of a user in accordance with a second embodiment.

FIG. 7 is a flow diagram the process for determining the fingerprints of a user in accordance with a second embodiment. In a first step 700, the user is instructed to swipe his or her fingertip across the touch screen. This instruction may be provided using the user interface illustrated in FIG. 4 above. In a second step 705, the system determines whether the user has initiated the swipe. If yes, then processing continues to step 710, otherwise processing returns to step 705. This can be detected by polling the touch screen sensors to determine whether the user has touched the screen and has started moving the point of touch in the direction desired.

In step 710, a sample of the values of the non-nominal sensors is captured with a time stamp. This sample can be performed about 100 times a second, although fewer or more samples may be obtained so long as it is within the performance characteristics of the display. In step 715, any sample values not contiguous to the majority of sample values are then removed or otherwise deleted as spurious signals in an initial filter or filtration step. The remaining sample values may be isolated and captured as a bounding box or matrix containing all the contiguous non-nominal values. The size of a sample bounding box may vary from sample to sample within a certain expected range. For example, the set of pixels represented by the bounding box should not be much larger than the size of a fingerprint. However, some perimeter non-nominal pixels may be excluded so long as it is balanced (not more on one side or the other) to keep from affecting the centroid to be calculated below. A check may also be performed to verify that the sample is close in location on the display to the previous sample, indicating a correct sample. The shape of the bounding box may also indicate if the user is tilting the finger improperly during the swipe.

Then in step 720, a tentative centroid of the remaining captured sample values is calculated using a weighted average. That is, if the values to the right of the median center point have a heavier weight than the values to the left of the median center point, then the user's fingertip is more to right of the median center point and the centroid should reflect that. Concurrently, an average fingerprint pressure is also calculated. This average pressure can be determined by various techniques including the size of the fingerprint sample relative to other fingerprint samples. Alternatively, for a capacitive touch screen, the total capacitance over the captured sample area (i.e. the bounding box) may be compared to an expected range to determine whether too much or too little pressure was applied.

Subsequently in step 722, it is determined whether the latest finger swipe sample was too heavy, too light, tilted too slow, too fast or otherwise improper creating an unacceptable sample. For example, the bounding box size may indicate the pressure was too heavy or too soft, the bounding box shape may indicate that the finger was improperly tilted during the swipe, the distance between samples may indicate that the velocity of the finger swipe was too fast or too slow, etc. The pressure, tilt or velocity can be determined by various techniques including the size, the shape, or the location of the fingerprint sample relative to other fingerprint samples. Alternatively, for a capacitive touch screen, the total capacitance over the captured sample area (i.e. the bounding box) may be compared to an expected range to determine whether too much or too little pressure was applied. If yes, then processing proceeds to step 730 to continue taking swipe samples (with an indicator of more or less pressure or other instructions such as described above with reference to FIG. 4), otherwise processing continues to step 725.

Then in step 725, the remaining non-nominal values, the time stamp, and the tentative centroid are saved to memory for processing as described below. Each time stamped sample is a matrix $C_a$ (at time a) with centroid $cent_a$ from 1 to n where n is the number of samples taken during the swipe. Subsequently in step 730, it is determined whether the user has stopped the swipe. If yes, then processing proceeds to step 735, otherwise processing returns to step 710 for another sample of the touch screen sensors. This can be detected by determining whether any of the touch screen sensors is detecting a touch or whether the past two or more samples have essentially the same value, indicating the user has stopped moving his or her fingertip across the screen. The number of samples should correspond to the speed of the user's finger across the screen and the resolution of the third coordinate system in the direction of the finger swipe (e.g. square root of a).

In step 735, the tentative centroids are adjusted. This is performed to obtain the most precise centroids possible given the information available. In this embodiment, the samples with the most balanced weighting (where the median and the weighted average are nearly equal) are identified. These balanced samples indicate where the finger is precisely balanced across a set of sensors. These balanced samples are then used to interpolate the other centroids. That is, the time stamps of the balanced centroids are used to interpolate the centroids of the other samples. This interpolation process will help linearize the data. Alternatively, the interpolated results may be weighted with the tentative centroids for each sample. In another alternative, indications of slight tilting of the fingerprint may be utilized to adjust the centroid to better locate the centroid near the same location of the fingertip being sampled for each sample. Other types of adjustments may be utilized based on detected variations in sampling.

In step 740, the time stamped samples are then processed in accordance with the formulas described above and as further described in FIG. 6 above to generate a resolved fingerprint using the newly calculated centroids of step 735. In step 745, it is determined whether sufficient data has been captured to resolve the fingerprint of the user. For example, there may be a minimum number of swipes before determining that there may be sufficient data to do a comparison of the resolved fingerprint to a set of fingerprints (one or more) to determine whether the resolved fingerprint is an authorized fingerprint. Alternatively, a measure of dispersion such as a confidence interval with a desired range or a desired standard deviation may be utilized to determine whether sufficient number of samples has been collected. If there is not sufficient data, then processing returns to step 700, otherwise, processing continues to step 750.

In step 750, the resolved digital fingerprint is then utilized as desired such as for security purposes. For example, the resolved digital fingerprint may be compared to a stored fingerprint (stored locally or remotely across a network) to determine whether the fingerprints are the same or different. This can result in one of several actions in step 755. If the resolved fingerprint is similar enough to one of the stored fingerprints (success), then an authorization signal may be provided in step 760. This signal may be a software instruction or an electronic signal which may be utilized by an operating system or application to notify the user and authorize the desired activity by the user. If the resolved fingerprint is sufficiently dissimilar from any of the stored set of fingerprints (failure), then a rejection signal may be provided in step 765. This signal may be a software instruction or an electronic signal which may be utilized by an operating system or application to notify the user and prevent the desired activity by the user. A failure signal may also be sent after a certain number of swipes if success has not been achieved yet. Alternatively, if the resolved fingerprint is similar to one or more of the stored set of fingerprints but not sufficiently similar for success (maybe), then further swipes would be requested to make a solid determination of success or failure with processing returning to step 700.

Mobile Device Continuous Authentication

With the above as background, the techniques of this disclosure can now be described.

According to this disclosure, a mobile device of the type described above and shown in FIG. 1 includes a mechanism by which a user, following an initial full authentication, continuously authenticates to the device via his or her unique fingerprint signature as recognized on the device's touchscreen. Preferably, the mechanism implements a finite state machine with at least three (3) states: full authentication, continuous authentication, and invalidation. A state machine in this disclosure refers to a computer-implemented machine that can be in one of a finite number of states. The state machine is in only one state at a particular time, and the machine transitions from one state to another upon a triggering event or condition. In one embodiment, the state machine is defined by the full authentication, continuous authentication and invalidation states, and the triggering condition for each such state. The names of the individual states are not intended to be limiting, and the state machine may include additional states and transitions depending on the nature and granularity of the security measures that may be desired.

Figures 8, 9:
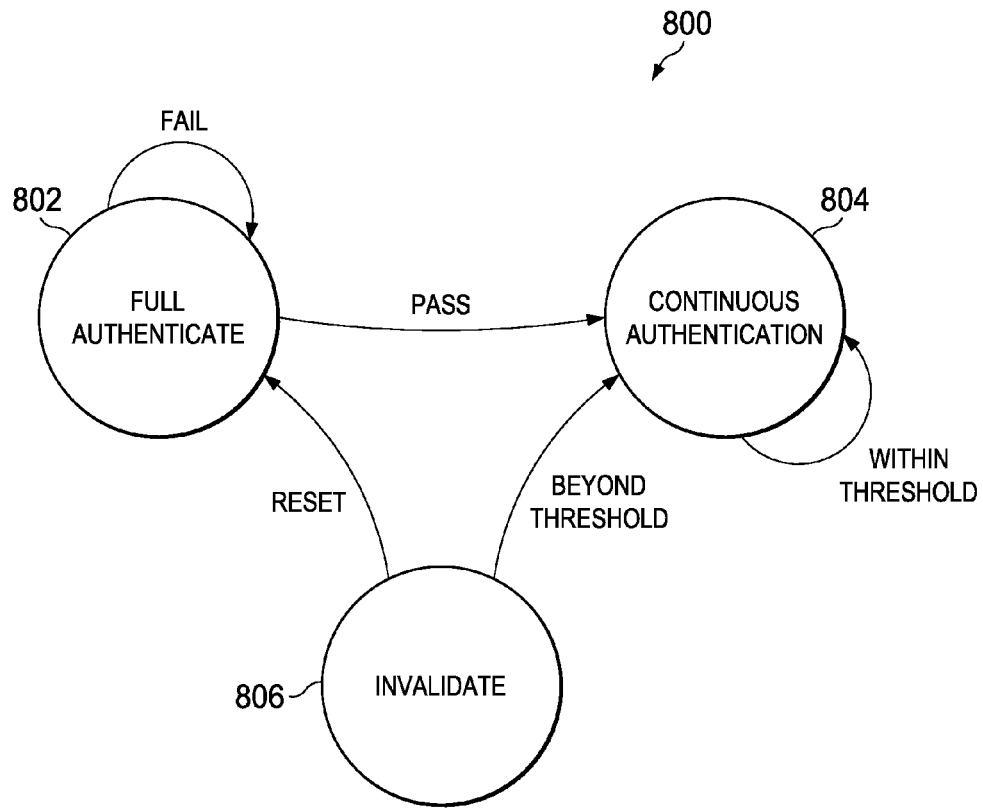
FIG. 8 illustrates a set of states associated with a state machine according to the techniques herein.
FIG. 9 illustrates sample pseudo-code for a multi-touch discrimination routine used to determine whether particular sample data generated from the touchscreen represents multiple fingertips.

FIG. 8 illustrates the state machine transitions. As noted, the state machine comprising three (3) states, full authentication 802, continuous authentication 804, and invalidation 806. When the user first initiates operation, the state "full authentication" 802 requires the user to confirm their identity, preferably using some robust authentication technique. The full authentication may be implemented using any of a set of well-known techniques such as pass-phrase entry, hardware authentication, or guided-software biometric identification, or some combination. Upon a successful full authentication, the state machine transitions to the continuous authentication state 804. As will be seen, the continuous authentication state monitors interactions between the user's digits and the capacitive touchscreen, and it analyzes those interactions to attempt to determine to some degree of certainty (likelihood) whether the person currently using the device is definitely not the person who was authenticated during the full authentication state. In other words, during the continuous authentication state, provided that the mechanism concludes that the current user could be the person who fully authenticated (in state 802), the state machine continues in the continuous authentication state. Only when the mechanism determines that the current user is definitely not the person authenticated during state 802 does the state machine transition to the invalidation state 806. The particular likelihood threshold at which this transition occurs may be configured, depending on the degree of security required. Indeed, the likelihood threshold itself may be varied based on given conditions or events (e.g., the nature of the user's interactions, the type of application, time since full authentication, etc.).

In the continuous authentication state, exemplary fingerprints for the user are loaded from a data store and are continuously compared against data samples captured as the user interacts with the device in general use. Continuous authentication presents unique challenges in this context because the quality of the samples may not be very high. In particular, when a user interacts with the device, many of these interactions involve "multi-touch" operations, wherein a single digit (a finger) touches the screen in multiple locations, or even multiple digits touch multiple locations on the screen grid at the same (or nearly the same) time. The problem of discriminating digits (and thus determining whether those digits match stored fingerprint signatures for the fully-authenticated user) becomes very difficult in this context. As noted above, one way the state machine 800 approaches this difficult technical problem is to enforce a negative identification technique instead of a positive one. As noted above, using this approach the recognition technique compares the data samples against the exemplary fingerprints to determine whether the individual currently interacting with the touchscreen is not the user from which the exemplary fingerprints were generated. At the time of such negative authentication, the state machine transitions to the invalidation state 806. In this state, operations (e.g., screen lock, device degradation, functional restrictions, etc.) are performed or imposed to secure the device against an unauthenticated use. On a next interaction, the machine transitions back to the "full authentication" state 802, thereby requiring robust authentication to continue operating in a normal mode.

In addition to the negative identification technique, the continuous authentication mode implements an additional set of functions to facilitate the digit recognition and analysis functions. These functions address the problem of multi-touch digit recognition. To facilitate the explanation of these functions, several definitions are now provided. As used herein, the term "sample" denotes a time period during which a user's finger(s) are in continuous contact with the sensing surface. An "interaction" denotes the sample data over a single sample for a single digit. When the interactions during a single sample period are summed together, the result is the original sample data. The term "resolution" denotes the sensor data density per unit area, and the term "quality" denotes a weighted measure of the distance traveled by a digit in both x and y coordinate space during an interaction, the time duration of the interaction, and the area of the contact during the interaction.

In considering common interactions with a touch-screen device, interactions can be classified by time duration (i.e. typically dragging an icon takes a longer time duration than tapping an icon), x and y travel distances (i.e. holding the finger in one place provides less unique sensor data than moving the finger in a circle), and area of contact (i.e. placing the whole finger on the sensor surface provides more data than placing just the tip of the finger on the device). At the sample level, preferably classification is split by "single touch" and "multi-touch" scenarios. In a single touch sample, the sample and interaction are identical. For multi-touch scenarios, the fingers must be tracked uniquely to avoid interaction contamination between interaction data sets. Multi-touch discrimination is not difficult if two touches (e.g., one digit in two separate locations on the capacitive touchscreen, or two distinct digits) are far enough apart. But the problem is exacerbated if there is not sufficient space between the touch regions so as to be able to discriminate the touches. As will be described below, to address this problem, a method for finger disambiguation is used in the multi-touch scenario to remove any ambiguity about which particular finger is being used by the user in the multi-touch operation.

As previously described in FIGS. 5-7, each interaction is calculated in the manner described above. As explained in FIG. 6, the centroid is calculated for the interaction's active region; the distance from the previous centroid is calculated as the finger travel, and the sample is stamped into a higher resolution grid after being transformed by the negative finger travel distance. This approach guarantees the quality by forcing the user through a single-touch, guided interaction. While that approach may work well in the full authentication mode, in a general usage situation, enforcing this quality is impractical if not impossible without degrading the use of the device. This is because the approach described in FIGS. 5-7 implicitly relies on the high quality of the sample and the sample and interaction equality. The following describes the preferred changes to that approach that are implemented herein to provide a meaningful continuous analysis.

First, because each interaction in itself is unlikely to have sufficient data to generate a positive or negative identification, preferably interactions are aggregated to form a current state for each finger. In addition, preferably older samples are assumed to diminish in value over time (and thereby made to contribute less and less influence to the analysis as time advances) so that the initial base condition loaded by the state transition into the continuous analysis state does not overwhelm new sample data. Further, preferably each interaction's data should also be fitted to the overall aggregate in a particular location (in the sample fingerprint) because the portion of the finger in contact with the sensor may change dramatically from interaction to interaction. This difference in finger orientation can be seen, for example, in comparing typical operations, such as tapping an icon with the tip of one's finger versus dragging an icon with the flat of one's fingertip.

As will be described further below, the quality of an interaction preferably is a [0, 1] value comprised of the logarithmic-scaled weighted sum of each component of the quality metric. The following is a representative quality metric:

$$q_i = \text{clamp}(\ln(\alpha T_i + \beta \Sigma(|x_{ij}| + |y_{ij}|) + \gamma \Sigma A_{ij}))$$

In the above equation, the weights α, β and γ are constants of fractional value less than 1 and that are device-dependent, as capacitive resolution and sample frequency vary between different hardware configurations. Once the interaction is calculated, it is then "fit" against the exemplar fingerprint, preferably using a line of best fit and least-squares solver, using Hamming distances, or the like, to thereby place the interaction in the correct location in the context of the exemplary fingerprint. Scaling the interaction is unnecessary, because the underlying capacitive resolution does not change from sample to sample.

Once the quality of a sample is determined and it is fit to the exemplar fingerprint, its contribution to the current state is then its value by the interaction's quality. Preferably, the entire result is scaled (e.g., by a factor $1+q_i$) so that, over time, higher quality interactions come to replace the base, and so that lower quality interactions contribute less to the current state. Should the current state's matrix then drop below a threshold of correspondence (such as by a Hamming distance) with the exemplar fingerprint, a negative identity is determined, and the state transition to invalidate occurs.

When a sample and interaction are equivalent, there is no need to be concerned with determining which finger is the exemplar during the interaction. It remains unchanged. Any time the digit leaves the surface, the sample ends, and at the start of the new sample, each digit exemplar is compared with the interaction data for the best match. With a multi-touch approach, however, the sample ends and a new sample begins when the number of digits in contact with the device changes; when no digits are in contact, the sample terminates without a new sample beginning.

To determine the number of samples and their general location, during continuous authentication an adjacency matrix is constructed where a node represents a sensor in the capacitive matrix. Two nodes are adjacent if the matrix entries are physically adjacent, above or below, and further if each cell in the matrix is above a detection threshold. In operation, any nodes which are adjacent to four other nodes are marked. After marking all interior nodes, the original graph is saved, and all marked nodes are deleted from the graph. This result is stored as an intermediate graph. The graph is then further reduced by sequentially removing any node with an adjacent neighbor until only disconnected nodes remain. If the sensor quality is lower than necessary for single neighbor detection, the adjacency technique can be relaxed to include diagonal neighbors, or by allowing adjacency to include nodes up to n nodes away. The preferred approach typically will depend on the quality of the sensor device and its resolution. At the end of the reductions, the number of remaining nodes is equivalent to the number of distinct touch regions. Using the intermediate graph, a convex hull is then calculated for each connected sub-graph. The convex hull is then applied to the original matrix; if the hull contains fewer than some threshold of non-touched cells, the touch region contains only a single finger impression. If, however, the region contains threshold or higher non-touched cells, the touch region contains more than a single finger impression and must be disambiguated.

Once direct correspondence of each touch region to a unique fingertip is achieved, that frame of the interaction is processed. Within an individual sample, a closest previous interaction step is the presumed candidate for the most likely match finger. At a fixed interval, preferably at least once per sample, the candidate matrix state is compared with the full battery of exemplars and reassigned to a closer match if one exists. This step also acts as a precursor for determining invalidation of the current set of exemplars. As long as one digit is within the threshold from the exemplars, preferably the process does not invalidate, although this may be configurable.

As noted above, if a touch region is ambiguous by the presence of more than one digit, it must be disambiguated. A method for disambiguation preferably relies on selecting a centroid of the region as an endpoint of line segments to radiate outwards to the edge of a convex hull. In mathematics, a convex hull (or envelope) of a set X of points in a x-y (Euclidean) place is a smallest convex set that contain X. Summing the capacitance from the centroid out each line segment then gives a break value at each segment. Selection of the two (2) lowest break values then give the bounding line segments for a disambiguated region. All adjacent nodes in the original adjacency graph that would be cut by the two bounding line segments are then removed and the calculation begins again. The process is repeated until each touch region contains fewer than the threshold non-touched cells, thereby signifying that each touch region contains only a single digit and disambiguation is completed. The result then is that the number of touch regions is equivalent to the number of fingers.

As noted above, the state machine remains in the continuation authentication mode until such time as a negative match (e.g., between a fingerprint of a current user and an exemplar fingerprint of a user for which the full authentication was performed) is statistically likely, or even very likely. The type of statistical correspondence, as well as the degree of correspondence, may be varied depending on the level of security that may be desired. Here, any type of statistical determination may be used to determine whether a sample fingerprint (alone or having resulted from the disambiguation) corresponds sufficiently to one or more of the exemplar fingerprints. Any known fingerprint matching technique may be used for this purpose.

FIG. 9 is representative pseudo-code for the disambiguation technique. The technique assumes that some interaction or interactions have taken place, and that there is a possibility of a multi-touch scenario. As noted above, to ensure proper operation of the state machine, some discrimination is necessary to ensure that continued comparison between the sample data being collected and the exemplar fingerprints (during the continuous authentication state) still generates reliable results. (Without such an assurance, the state machine may transition inappropriately). The high level operations begin at step 902 by reducing the hull grid, which is an optimization performed to reduce processing and storage requirements. At step 904, a convex hull is calculated. There are many known algorithms that exist for computing the convex hull of a finite set of points, with various computational complexities estimated in terms of n, the number of input points, and h, the number of points on the convex hull. Sample algorithms include, without limitation, Graham (O(n log n) time complexity), Kirkpatrick-Seidel or Chan (O(n log h) time complexity), and many others. At step 906, a number of nominal sensors (in the touchscreen) defined by the hull points is calculated. At step 908, a test is performed to determine whether the number of nominal sensors within the convex polygon is greater than a threshold. If the outcome of the test at step 908 is positive, the individual fingertips must then be disambiguated. This is step 910. If, however, the outcome of the test at step 908 is negative, then the routine continues by returning all regions selected. FIG. 10 illustrates representative pseudo-code for step 902 in FIG. 9.

FIG. 11 illustrates representative pseudo-code for the technique to disambiguate individual fingertips. At step 1102, the routine determines the centroid of the region bounded by the convex polygon for the convex hull. At step 1104, a minimum path to the boundary of the polygon is then taken. This path may be determined in one of various ways, e.g., brute force, Hamming distance, least squares, and the like). At step 1106, the routine generates a linear equation to each path and separates the two regions, preferably either by rotation, translation or X-Y snap-to. The routine continues at step 1108 to return the distinct regions identified for each fingertip.

Pseudo-code samples herein are provided merely for purposes of explanation. All rights therein are reserved (© 2013, IBM Corporation).

The subject matter described herein has many advantages. The techniques enable a device to continuously detect, monitor and analyze a user's fingerprint signature through the user's course of interaction with the device. As explained above, the approach allows for robust security measures necessary for both personal and corporate security while freeing the user from manually performing the task of authentication repeatedly. With this approach, the user is not forced to take additional steps or measures beyond their ordinary usage of the device; simply by interacting with the device, the techniques described herein monitors the user's identity. By using a negative identification approach, the quality and resolution of the data samples in aggregate becomes less important, thereby simplifying the analysis function. The techniques described herein also provide computationally-efficient and highly-accurate techniques for finger disambiguation when multi-touch scenarios are required to be detected and analyzed to facilitate the continuous authentication.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, the device may communicate with other devices and systems over a network, such as the Internet, an intranet, an extranet, a private network, or any other communications medium or link.

Still more generally, the subject matter described herein can take the form of an entirely hardware embodiment, an entirely software embodiment or an embodiment containing both hardware and software elements. In a preferred embodiment, the entropy pooling management function is implemented in software, which includes but is not limited to firmware, resident software, microcode, and the like. Furthermore, as noted above, the entropy pooling functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the state machine in general and the continuous authentication techniques in particular are implemented in a special purpose computing entity, preferably in operating system or application software executed by one or more processors (see, e.g., FIG. 2). These techniques (or portions of them) also may be implemented in hardware (e.g., special-purpose chips, field-programmable devices such as FPGA, FPLA or the like) or firmware. When implemented in software, the software is maintained in one or more data stores or memories associated with the one or more processors, and the software may be implemented as one or more computer programs. Collectively, this special-purpose hardware and software comprises an identity management and access control mechanism for the mobile device as described.

While the techniques are described in the context of a mobile device, they may be used in other devices including, without limitation, desktop computers that include touchpads as input devices, in automobile man-machine interfaces, in general appliances that include touchpads or similar input screens, and the like.

The functions described herein (in whole or in part) may be implemented as an adjunct or extension to an existing application, device, system or process.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The techniques disclosed herein are not limited to a mobile device having an operating system of the type described, but this will be a typical implementation. As noted, the above-described function may be used in any system, device, sub-system, site, or the like wherein devices may use biometrics for access control.

Having described our invention, what we now claim is as follows:

1. A method of restricting access to a device except to a user whose identity has been authenticated using a first authentication scheme, the device having a touchscreen, comprising:
   as the device is used, monitoring interactions with the touchscreen against fingerprint data associated with the user whose identity has been authenticated to generate a fingerprint of an individual currently interacting with the device;
   based on the monitored interactions including a comparison of the fingerprint with the fingerprint data, determining, within a given threshold, whether the individual currently interacting with the device, as represented by the interactions, could be the user whose identity has been authenticated using the first authentication scheme;
   based on the determining step identifying a negative match between the fingerprint and the fingerprint data, transitioning the device to a restricted mode of operation when it cannot be assured that the individual currently interacting with the device could be the user whose identity has been authenticated; and
   maintaining the device in the restricted mode of operation until an identity of the user is re-authenticated using the first authentication scheme;
   wherein monitoring interactions further includes:
      determining whether given interaction data collected represents a multi-touch interaction with the touchscreen;
      when the given interaction data collected represents the multi-touch interaction, determining whether the multi-touch interaction represents more than one finger;
      when the multi-touch interaction represents more than one finger, disambiguating the given interaction data to identify at least first and second fingers by fitting the given interaction data into a convex hull polygon, determining a centroid of an area bounded by the convex hull polygon, identifying at least first and second minimum paths to a boundary of the convex hull polygon to generate first and second regions, and designating the first and second regions as corresponding to distinct fingerprints;
wherein at least one of the steps is implemented in software executing in a hardware element.

2. The method as described in claim 1 wherein the restricted mode of operation is one of: a screen lock, placing the device in a degraded operating state, and restricting access to at least one function of the device.

3. The method as described in claim 1 wherein the first authentication scheme is one of: pass-phrase entry, hardware authentication, and software-based biometric identification.

4. The method as described in claim 1 wherein the software executes as a finite state machine.

* * * * *